(12) United States Patent
Crowley (10) Patent No.: US 7,142,114 B2
(45) Date of Patent: Nov. 28, 2006

(54) NON-CONTACT PATIENT TEMPERATURE MEASUREMENT

(75) Inventor: Christopher T. Crowley, Golden, CO (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/675,111

(22) Filed: Sep. 30, 2003

(65) Prior Publication Data

US 2005/0070811 A1  Mar. 31, 2005

(51) Int. Cl.
*G08B 13/14* (2006.01)

(52) U.S. Cl. .............................. 340/572.1; 340/572.4; 340/572.8; 340/539.12; 340/539.27; 340/870.01; 340/870.7; 600/300; 600/549

(58) Field of Classification Search .............. 340/505, 340/10.1, 10.41, 10.51, 584, 870.17, 573.4, 340/572.1, 539.12, 539.27, 870.01, 870.07, 340/573.1, 572.4, 572.8, 870.7; 705/2, 3; 600/300, 549
See application file for complete search history.

(56) References Cited

U.S. PATENT DOCUMENTS

| | | | |
|---|---|---|---|
| 4,075,632 A | 2/1978 | Baldwin et al. ............. 343/6.8 |
| 4,532,892 A * | 8/1985 | Kuzara ................... 119/51.02 |
| 5,019,813 A * | 5/1991 | Kip et al. ................ 340/10.51 |
| 5,499,017 A * | 3/1996 | Beigel ..................... 340/572.1 |
| 5,638,832 A * | 6/1997 | Singer et al. ............... 128/899 |
| 5,774,062 A * | 6/1998 | Ikefuji ....................... 340/10.4 |
| 5,833,603 A * | 11/1998 | Kovacs et al. .............. 600/317 |
| 5,859,873 A | 1/1999 | Ritter ......................... 375/259 |
| 6,054,935 A * | 4/2000 | Urbas et al. ........... 340/870.17 |
| 6,346,886 B1 | 2/2002 | De La Huerga ......... 340/573.1 |
| 6,366,206 B1 * | 4/2002 | Ishikawa et al. ......... 340/573.1 |
| 6,714,133 B1 * | 3/2004 | Hum et al. .............. 340/573.4 |
| 6,806,808 B1 * | 10/2004 | Watters et al. ........... 340/10.41 |
| 2001/0033230 A1 * | 10/2001 | Barber et al. ............ 340/573.2 |
| 2004/0036626 A1 * | 2/2004 | Chan et al. ........... 340/870.17 |
| 2004/0153344 A1 * | 8/2004 | Bui et al. ...................... 705/3 |

\* cited by examiner

*Primary Examiner*—Tai Nguyen
(74) *Attorney, Agent, or Firm*—Russell T. Manning; Marsh Fischmann & Breyfogle LLP (57) ABSTRACT

A method and system are provided for allowing non-contact temperature measurement of an animate body. More particularly, a transponder sensor device attached to an animate body is utilized to non-intrusively measure a temperature of the animate body in response to an interrogation signal transmitted over an air interface from a portable probe. In one embodiment, the sensor device is a passive device that is operative to collect energy from an interrogation signal emitted from the probe. In this regard, the sensor device does not require an internal power source. The collected energy is utilized to measure the temperature of the animate body and transmit a response signal containing temperature information back to the probe over the air interface.

45 Claims, 5 Drawing Sheets

NON-CONTACT PATIENT TEMPERATURE MEASUREMENT

FIELD OF THE INVENTION

The present invention is directed towards a method and system for non-contact temperature measurement of an animate body. More particularly, the invention is directed to utilizing a passive transponder sensor device to obtain a patient temperature in response to an interrogation signal transmitted from a portable hand-held reader.

BACKGROUND

In many medical applications, it is desirable to periodically measure the temperature of a patient for diagnostic purposes. In this regard, a variety of temperature measurement devices may be utilized. Such devices include liquid based thermometers (e.g., mercury, alcohol, etc.), infra-red tympanic measurement devices, bi-metal conductors as well as thermally resistive elements (e.g., as used in a digital thermometer). Use of these temperature measurement devices typically requires physically accessing a patient orifice (e.g., a patient's mouth, ear or anus). Alternatively, some thermally sensitive sensors (e.g., bi-metal conductors) may be affixed to a patient's body and hardwired to a measuring device.

While the above-noted methods typically provide adequate temperature measurements for diagnostic purposes, each method may be intrusive for a patient and/or difficult for a medical technician to administer as well as require several seconds or minutes per measurement. For example, oral thermometers may have to be held beneath a patient's tongue for several minutes to provide an accurate temperature measurement. This may raise difficulties in cases where a patient is combative, injured, or very young. Furthermore, periodic measurements may prevent a patient from resting. Tympanic measurements while generally requiring a shorter read time to establish a patient temperature still require that a medical technician disturb a patient to access their ear. Furthermore, such temperature measurement methods may result in a technician contacting a patient's bodily fluids. Accordingly, this may require a technician to put on protective clothing (e.g., latex gloves) prior taking a temperature measurement and/or sanitizing after such measurement. As will be appreciated, this may substantially increase the time required to measure a patient's temperature.

Hard-wired sensors may automatically measure a patient's temperature on a predetermined schedule (e.g., periodically). Such sensors may alleviate time and sanitation issues for medical technicians. However, such hard-wired sensors restrict the movement of a patient and typically must be removed or disconnected to allow a patient to move about (e.g., to a restroom or different site in the hospital). In this regard, it would be desirable to have a temperature sensor device that allows for non-contact temperature measurement and which does not hinder the mobility of a patient.

SUMMARY OF THE INVENTION

The objective of the present invention is to provide a system for obtaining a patient's temperature without contacting the patient while allowing the patient to move freely.

Another objective of the present invention is to provide a system that allows a medical technician to readily measure a patient's temperature in a quick and convenient manner.

Another objective of the present invention is to provide a system for measuring a patient's temperature over an air interface.

A related objective of the present invention is to provide a system for measuring a patient's temperature over an air interface where a direct line of sight does not exist between a temperature sensor and a temperature reader.

These and additional objectives are achieved by the present invention which utilizes a transponder sensor system to non-intrusively measure the temperature of an animate body over and air interface. In this regard, a sensor may be interconnected to an animate body (e.g., a patient) and be read over an air interface by a portable reader or probe that is disposed within a predetermined range of the sensor.

According to a first aspect of the present invention, a method for non-invasively measuring an animate body temperature via an air interface is provided. In this regard, a passive transponder sensor device gathers energy emitted from a portable probe for use in measuring a patient's temperature and transmitting that temperature information back to the probe. The method includes emitting an interrogation signal from a first antenna interconnected to a portable probe (e.g., hand-held) containing a portable power source. A portion of this interrogation signal is received at a second antenna attached to the sensor device, which may be interconnected to an animate body. This interrogation signal is received via an air interface. Energy derived from the interrogation signal is utilized to measure the temperature of the sensor device, which may correspond to the temperature of the animate body. Furthermore, the energy from the interrogation signal is utilized to transmit a response signal indicative of the measured temperature to the portable probe, again over the air interface. Once the portable probe receives such information, it may provide an output indicating the temperature of the sensor device. As will be appreciated, the method allows medical technicians to measure a patient's temperature without disturbing the patient. In this regard, temperature may be measured over an air interface by disposing the probe within a predetermined distance of the sensor device, as will be discussed herein.

The step of emitting an interrogation signal may comprise the emission of any signal that is operative to deliver energy over an air interface to a sensor device that is operative to use the energy to respond to the interrogation signal. Such systems may be broadly categorized as electric systems, which are based on radio propagation (e.g., radio frequency device), and magnetic systems, which are based on magnetic induction. Each system allows energy to be transmitted over an air interface for use in powering a remotely located device. In this regard, the interrogation signal may comprise an electromagnetic energizing field or a magnetic energizing field. Furthermore, each system generates a signal that may propagate through intervening material (e.g., patient tissue, clothes, blankets, etc.). That is, the electromagnetic and magnetic energizing fields may deliver energy to the transponder sensor device even though a clear line of sight does not exist between the sensor and the portable probe.

When a magnetic interrogation signal is emitted from the first antenna, energy may be derived from that signal through magnetic induction. In this regard, the magnetic system relies on setting up a quasi-static magnetic field around a transmitting coil (e.g., in the portable probe). By way of example only, such quasi-static magnetic fields may be emitted in the frequency range of between about 125 KHz and about 29 MHz. When a second coil is introduced into that field a time varying magnetic flux is incident on that coil, inducing a voltage on its windings. Accordingly, the sensor device may utilize an antenna having a coil (e.g., an inductor) and/or a capacitor to collect and store energy from the magnetic field. In such magnetically coupled systems, the read range between the hand held probe and the sensor device is typically limited to the range determined by the magnetic line fields generated between the effective north and south poles generated at the hand held probe.

Electric systems utilizing RF interrogation signals typically provide for increased read ranges between the hand-held probe and the sensor device in comparison with magnetic field systems. By way of example, such radio frequency interrogation signals may be emitted in the frequency range of between about 100 KHz and about 2.5 GHz. Typically, higher frequency signals correspond to longer read ranges whereas lower frequency signals correspond to shorter read ranges. Furthermore, the power of the signal may also affect the read range.

In either system, the frequency and/or power settings of the interrogation signal may be tailored to correspond with a desired read range. In this regard, an interrogation signal may be selected such that it may be localized to a single sensor device. For example, where two patients share a single room it may be desirable to have a read range that permits only a single transponder sensor to respond for each interrogation signal emission. In this regard, the interrogation signal may be limited to a range of no more than about 4 feet and more preferably to a range of no more than about 1.5 feet. This may allow a medical technician to dispose a hand-held probe device within the read range of a sensor on a first patient without activating a sensor on a second patient. As will be appreciated, this may reduce or eliminate erroneous readings. Furthermore, the power settings may be adjustable such that read range may be selected (e.g., increased or decreased) by a user. For instance, in an operating room where there is only one patient, it may be desirable not to be close to the patient due to sterility concerns. Accordingly, the read range may be increased.

Receiving a portion of the interrogation signal may, as noted above, depend on the intensity and/or type of interrogation signal emitted by the portable probe. In this regard, the antenna on the sensor device may be tailored for specific interrogation signals. For example, for magnetic interrogation signals, the antenna may include an inductor and/or a capacitor. Alternatively, for radio frequency signals, the antenna may comprise a simple conductor (e.g. a metallic rod). In any case, the step of receiving will typically further include converting a portion of the interrogation signal into a drive signal. This may entail rectifying the typically alternating signals received by the antenna to produce, for example, a DC voltage. In this case, such a voltage may be stored in an energy storage device (e.g., capacitor) prior to its use in measuring a patient's temperature and/or transmitting temperature information to the probe.

The energy derived from the interrogation signal is utilized to measure the temperature of an animate body. In this regard, such energy may pass through a temperature sensitive device in order to provide an output signal indicative of the temperature of the sensor. As will be appreciated, the temperature of the sensor may correspond to the temperature of an animate body if the sensor is thermally interconnected to such an animate body. In any case, the output signal indicative of the measured temperature may be transmitted to the probe by the air interface. This may be performed utilizing backscatter data modulation processes and/or through the use of a separate signal emitter (e.g., a transmitter). In this regard, the sensor may respond at the same signal frequency as the interrogation signal, or at a separate frequency. Utilization of backscatter modulation techniques may provide a simplified sensor device.

Irrespective of how the output signal indicative of the measured temperature is transmitted back to the probe, a user output is provided that indicates the temperature of the sensor device. Such user output may include a visual output and/or an auditory output. Furthermore, such temperatures may be stored in a memory contained within the portable probe such that they may be later recorded and/or downloaded to a computer database (e.g., for subsequent review and/or for patient record maintenance). When a memory is available, the method may further include entering patient specific data into the portable probe for storage with such measured temperatures. Finally, the sensor may include componentry that allows it to, in addition to the output signal indicative of temperature, provide reference data upon interrogation. Such reference data may include, for example, a patient identification number and/or calibration information. In this regard, the temperature information may be automatically stored in an appropriate file.

In one application, the method provides for near instantaneous temperature measurement. In this regard, a user may selectively activate the first antenna interconnected to the portable probe to emit an interrogation signal to or toward the sensor device. In this application, receiving, utilizing and transmitting steps performed by the sensor device may automatically be completed in response to the emitting step. This may allow a technician to quickly and conveniently measure a patient's temperature without disturbing the patient. Furthermore, as there is no contact between the technician and the patient, sanitation is of less concern.

To enhance the accuracy of the temperature measurements, it may be desirable to interconnect the sensor to an area of the body that better reflects a core body temperature. This may include attaching the sensor to the armpit or crotch region of the patient. However, this is not a requirement. In any case, it may be desirable to establish an effective thermal connection between the sensor device and the body. In one application, the sensor device may include an adhesive surface that allows the sensor to be adhered to a dermal surface of the animate body. As will be appreciated, such adhesive interconnection allows for enhanced thermal conduction between the sensor device and the animate body as well as a convenient means for attachment. In this application, attachment of such sensor may further include the removal of a protective layer (i.e., a peel away sheet) from the adhesive surface. After use, which may extend for numerous temperature measurements over an extended period (e.g., a number of days), such an adhesively attached sensor may be removed from the dermal surface and disposed. Alternatively, the sensor device may be a reusable device. For example, the sensor may be incorporated into a wristband or other holder operative to hold the sensor against a dermal surface of an animate body.

According to a second aspect of the present invention, a passive transponder temperature measuring system is provided for non-contact, localized (e.g., within a predetermined range) temperature measurement of an animate body (e.g., a patient). The system includes a portable probe for transmitting and receiving signals via an air interface. The probe includes an antenna, a power source and a user output. The antenna or separate antennas are capable of transmitting and receiving the signals over the air interface. A sensor interconnectable to an animate body receives an interrogation signal from a hand held probe, measures the temperature of an animate body, and transmits a response signal indicative of the measured temperature to the probe. Accordingly, the sensor is operable to both receive and transmit signals over an air interface. The sensor includes an antenna for receiving and/or sending signals, a conversion circuit for converting a signal received from the probe to a drive signal, and a temperature measurement device operative to utilize the drive signal to obtain a temperature of the animate body. Furthermore, the sensor may include componentry for generating a modulated response signal for transmission to the probe. The sensor comprises a passive transponder sensor that is operative to automatically respond to an interrogation signal received from the hand held probe. Accordingly, as the sensor may contain no onboard power source, such a sensor may have a long shelf life, be easily manufactured, and be disposable after use.

In one embodiment, the sensor device may be formed as a small, integrated chip encapsulated in a potting material (e.g. epoxy or ceramic). This potting material may be thermally conductive to provide improved sensor readings. Furthermore, non-patient contacting surfaces of the sensor may be insulated to help ensure the internal components of the sensor device are maintained at or near the same temperature as the animate body. That is, the insulation may reduce distortions caused by ambient conditions.

The probe may comprise any hand held device that is operable to transmit and receive signals over an air interface. In this regard, the probe may comprise a simple unit having a means for initiating transmission of an interrogation signal over the air interface such that a temperature may be measured by the sensor, transmitted to the probe, and output at the probe (e.g., visually or audibly). In one embodiment, the probe may include a switch or button that allows a user to selectively activate the probe in order to read a patient's temperature. That is, a user may selectively activate the interrogation signal. In other embodiments, the probe may include more complex componentry including, for example, memory structures, user input(s), and/or a data input/output port(s). Such a device may allow a user to input information into the probe prior to or in conjunction with obtaining a temperature of an animate body. For example, the user may input a patient identification name/number that may be stored with a measured temperature. Likewise, utilization of a memory may allow for storage of a plurality of temperatures from a plurality of animate bodies or a plurality of temporally distinct temperatures from a single animate body. In this regard, the portable probe may also include a timer/clock to allow measured temperatures to be indexed against a time and/or date.

The portable probe may generate any interrogation signal that may be received by the transponder sensor. Such signals include magnetic and electromagnetic signals. Depending upon the type of interrogation signal generated by the probe, the structure of the probe's antenna may be modified accordingly. Furthermore, the size of such antenna may be dictated by the desired read range between the probe and the sensor device.

Typically, the portable probe will include a microprocessor for generating a temperature from the response signal(s) received from the sensor. Accordingly, the probe may include algorithms, look-up tables, curves, or other data for use in converting the response signal to a temperature. That is, the processor will process the response signal to determine a temperature. Furthermore, a processor may further include mixers, demodulators and/or digital signal processing for use in identifying/demodulating a response signal from the sensor.

The elements of the sensor may include additional components for use in receiving a signal, measuring a temperature, and transmitting a response signal to the probe. For example, the conversion circuit may include a plurality of elements for use in generating a drive signal. In one embodiment, the conversion circuit may include one or a plurality of diodes for use in converting (e.g., rectifying) an alternating signal into a DC voltage. In this regard, the conversion circuit may be a half wave rectifier, a full wave rectifier and/or a voltage-doubling rectifier, depending on the power needs of the sensor device. Furthermore, the sensor device may include a capacitor or other energy storage means to store produced voltages. What is important is that the conversion circuit is operable to provide a drive signal and may be applied to the temperature measurement device in order to measure temperature of the body.

The temperature measurement device may be any device operable to provide an output signal that is indicative of the temperature of the sensor, in response to an applied drive signal. The temperature measurement device may be a temperature sensitive resistor(s) (i.e., thermistors), and/or a thermocouple(s).

In order to transmit a response signal indicative of the temperature to the probe, the sensor may utilize any of a number of appropriate transmission methodologies. For example, the sensor device may include a transmitter operative to transmit a signal at a set frequency. This frequency may be different than the frequency of a received interrogation signal. In this regard, the probe could simultaneously send and receive signals without complex demodulating procedures. Alternatively, the transmitter may operate in a fly-back mode wherein data is transmitted at the same frequency of the interrogation signal immediately after the interrogation signal stops. In this regard, energy dissipating in the sensor device may provide a decaying signal that may be matched to, for example, a time profile stored within the probe. As will be appreciated, use of a separate frequency transmitter in the sensor may increase the complexity and cost of the device.

In one application, the sensor device utilizes a backscatter modulation process to transmit data back to the probe. In this application, the sensor varies the load applied to its antenna in accordance with the output of the temperature-sensing device (e.g., utilizing an oscillator). That is, the antenna loads the energizing field. In this regard, the antenna of the sensor device will reflect a portion of the interrogation signal, which is modulated according to the varying load on the antenna. This modulated signal is indicative of the output of the temperature-sensing device. The probe receives this modulated signal for processing in order to generate an output temperature. The use of backscatter modulation techniques allows for production of a simplified integrated chip sensor device that may be made in a cost effective manner.

In another application, the sensor may also include a memory device. Such a memory device may be of a type that requires no continuous power to retain data (e.g., EPROM memory). Such memory devices may allow data to be stored with the sensor device that may be read each time an interrogation signal is received. For example, prior to application to a patient, such a memory device may be programmed with patient information (e.g., name, room number etc). Additionally, such a memory device may include a factory set calibration value to increase the accuracy of the system. Examples of such memory include read-write memory, write-once/read many memory and read-only memory. As will be appreciated, the type and function of memory incorporated into the sensor device may affect the power requirements of the system as well as the cost of the sensor device.

DETAILED DESCRIPTION

Disclosed herein is a system and method for non-contact monitoring of a patient's temperature wherein temperature data is transmitted over an air interface. In this regard, a subject (e.g., patient) may wear a temperature sensor that, upon request, transmits the temperature of the patient to a reader over the air interface. More particularly, the system and method utilize a transponder sensor that is able to provide a patient's temperature upon receiving an interrogation signal from a portable reader/probe disposed within a predetermined range of the sensor. In one particular application, the system allows medical personnel, using a portable hand-held reader, to quickly and conveniently measure a patient's temperature without disturbing the patient or raising sanitation concerns.

Figure 1:
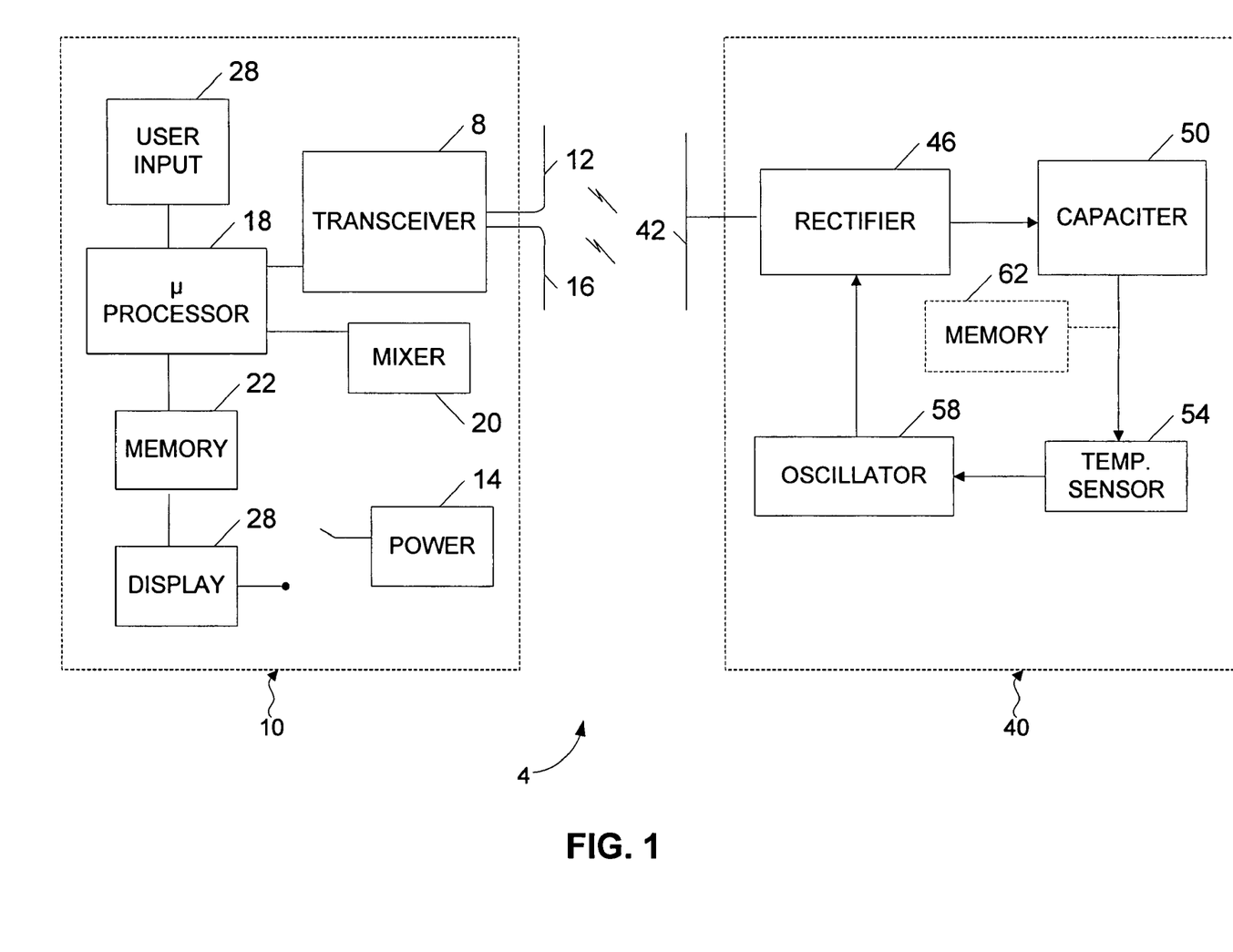
FIG. 1 shows a schematic of one embodiment of the radio frequency temperature sensor of the present invention.

FIG. 1 illustrates one embodiment of a radio frequency temperature sensor (RFTS) system 4 that makes use of radio frequency propagation to measure patient temperatures. As will be discussed herein, energy radiated from a source (e.g., the reader 10) is collected by a passive transponder sensor 40, which utilizes this energy to determine a patient temperature and transmit this temperature data to the reader 10. The term "passive transponder" as used herein is meant to include any transponder that obtains its operating power from an energy field generated by the reader 10. In this regard, the energy field may be electromagnetic or a magnetic (e.g., a RF field or a magnetic induction field). In the embodiment shown, energy radiated from the reader 10 comprises an electromagnetic field (i.e., an RF signal). In this regard, the system 4 is an electrically coupled transponder system as opposed to a magnetically coupled system.

As described herein, the transponder sensor 40 utilizes a backscatter modulation process to respond to an interrogation signal from a reader 10. In this embodiment, temperature data is transmitted to the reader 10 by modulating and re-radiating (e.g., reflecting) a response signal at the frequency of the interrogation signal. As will be appreciated by those skilled in the art, use of the backscatter process allows for production of simplified transponder sensors that may be economically produced. However, various aspects of the present invention are not so limited.

The electrically coupled transponder system 4 of FIG. 1, provides a read range (i.e., the maximum allowable spacing between the reader 10 and the transponder 40 that permits data transfer) that is greater than the read range of a magnetically coupled transponder system. That is, the electrically coupled system 4 is not limited to the range determined by lines of force emitting from a magnetic field generator, which required for magnetic induction. Rather, the electrically coupled transponder system 4 uses electric field propagation properties of radio communication to convey energy and data from the reader 10 to the transponder sensor 40 and data from the transponder sensor 40 to the reader 10. In this electrically coupled transponder system 4, the reader 10 emits an electromagnetic field over a specific zone, the size of which depends on the operating frequency of the system 4 and the size of the antenna 12 on the reader 10. When a transponder sensor 40 is disposed within this zone, the signal emitted by the reader 10 activates it, whereupon it begins to transmit data back to the reader 10.

The signal generated by the reader 10 provides power to the transponder sensor 40 and typically provides timing information as well. By way of example, such electrically coupled transponder systems may include high-frequency systems (e.g., between about 850–950 MHz, and about 2.4–2.5 GHz), intermediate frequency systems (e.g., between about 10 MHz—and about 15 GHz) and low frequency systems (e.g., between about 100 KHz and about 500 KHz) as well as other suitable frequency ranges. Each of the noted frequency ranges has individual applications that significantly outperform the others. For example, high frequency systems are typically utilized where long read ranges and high reading speeds are required. In this regard, low frequency systems may be more appropriate for medical settings where it may be desirable to activate only a single transponder sensor 40 at a given time. That is, it may be desirable to activate only those sensors within, for example, about eighteen inches of the reader 10 such that interfering signals from other sensors (e.g., on nearby patients) are not received. However, this is not a requirement.

In general, the portable reader 10 includes the following components: a transceiver 8 for sending and receiving signals to and from a transducer sensor 40; an antenna 12 for transmitting signals; an antenna 16 for receiving signals; a microprocessor 18 that decodes inbound data; a memory 22 that stores data for comparison with inbound data and/or stores the inbound data; a power source 14; and a user display 26. In further embodiments, the reader 10 may also include a user input 28 such as, for example, a keyboard and/or an infra-red reader. Furthermore, the reader 10 may utilize a single antenna for transmitting and receiving signals. Likewise, the transceiver 8 may utilize a separate transmitter and receiver. What is important is that the reader 10 is able to provide an interrogation signal at the transponder sensor's operating frequency and receive signals from the transponder sensor 40.

As shown, the transponder sensor 40 is a passive transponder that receives energy from the interrogation signal provided by the reader 10. In this regard, the antenna 42 of the transponder sensor 40 collects part of the energy field emitted from the reader 10. A rectifier circuit 46 within the transponder sensor 40 converts the collected energy into a DC voltage. This rectifier circuit 46 may comprise a diode and capacitor circuit that utilizes diodes fast enough to operate at the operating frequency of the energizing field. In this regard, the energy may be converted to a DC voltage and stored in a capacitor 50. This DC energy may then be utilized to operate the transponder sensor 40. Half wave rectifiers may be utilized, however, full wave rectifiers will typically be utilized to provide enhanced and/or continuous power. Furthermore, more sophisticated rectifying circuitry can be used such as, for example, voltage doubling circuitry if so required/desired. As will be appreciated, if a full wave rectifier is utilized, the capacitor may not be required.

Figure 2:
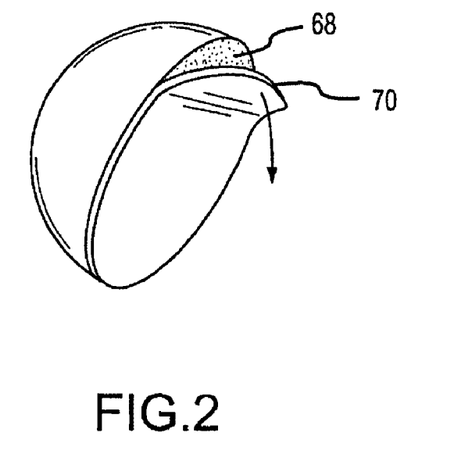
FIG. 2 shows one embodiment of a sensor device that may be utilized with the system of FIG. 1.

Energy stored in the capacitor 50 or from the rectifier circuit 46 is provided to a temperature sensing means 54 that is operable to determine the temperature of the sensor 40. Referring briefly to FIG. 2, it will be noted that the transponder sensor 40 may be formed as a small integrated circuit that may be encapsulated in a potting material forming a shell structure 66. This shell structure 66 may be adhered to a patient's skin. Upon being adhered to a patient's skin for a predetermined amount of time, the temperature of the transponder sensor 40 will correspond to the patient's temperature. In this regard, it may be preferable to place the sensor within a patient's armpit, groin, mouth or rectum to obtain a temperature indicative of a core body temperature. In any case, the temperature sensor means 54 is operative, in response to an applied voltage, to produce an output indicative of the sensor's temperature. In the present embodiment, a thermally sensitive resistor (i.e., a thermistor) is utilized to provide a temperature signal (e.g., a resistance) that varies in a known manner with temperature.

The temperature signal generated by the temperature sensor means 54 is utilized as an input for an oscillator 58 in the transducer sensor 40. The oscillator 58 varies a load applied to the antenna 42 in accordance with the temperature signal (i.e., the data to be transferred to the reader 10). This variance of the antenna load changes the antenna matching between the sensor 40 and the reader 10 causing varying amounts of the interrogation signal to be reflected back towards the receiving antenna 16 of the reader 10. In this regard, the temperature signal modulates the return signal transmitted (i.e., reflected) to the reader 10 through the backscatter modulation process. As shown, modulation of the return signal is achieved by loading the rectifier 46 to load the antenna 42. As will be appreciated, other methods may be utilized for loading the antenna 42. For example, modulation may be performed utilizing a PIN diode with a variable RF resistance. In this embodiment, the RF resistance of the PIN diode may be controlled by varying a low-frequency or DC current passing through the diode. In this regard, the output of the oscillator may pass through such a PIN diode to vary the load of the antenna 42, which, as discussed above, causes varying amounts of the energizing field to be reflected back towards the receiving antenna 16 of the reader 10.

In addition to the components shown in the transponder sensor 40, it will be appreciated that the transponder sensor 40 may further include a memory 62 for storing information therein. For example, the memory 62 may comprise a memory (e.g., EPROM) that does not require continuous power to retain information. In this regard, the transponder sensor 40 may remain passive in nature. Such a memory 62 may be preprogrammed or, in some cases, programmed by the end users (e.g., prior to application to a patient) such that information in addition to temperature may be provided to a reader 10. This may allow, for example, factory set calibration values, a reference number or patient information to be provided with a detected temperature upon interrogation.

The receiving antenna 16 of the reader 10 collects returning energy such that the modulated signal from the transponder sensor 40 may be demodulated to generate a temperature. As shown, a mixer 20 is utilized to demodulate the signal. The mixer 20 receives two inputs: the original interrogation signal and the modulated signal from the transponder sensor 40. In this regard, the original signal may be filtered out of the modulated signal leaving the temperature signal generated by the temperature sensing means 54. As noted above, this temperature signal is indicative of the patient's temperature. Accordingly, the processor 18 may compare the temperature signal with information in the memory 22 to produce the temperature. For example, the memory 22 may include algorithms, R-C time profiles or resistance values that correspond to known temperature data associated with the temperature sensing means 54 of the transponder sensor 40. That is, upon separating the temperature signal from the modulated signal, the temperature signal may be converted to a temperature. Once such a temperature is determined, it may be displayed on the user display 26.

As noted, the transponder sensor 40 is an integrated circuit that is adapted for attachment to a patient's skin. See FIG. 2. In this regard, the transponder sensor 40 may comprise a disposable chip roughly the size of a dime that may be adhered directly to a patient's skin (e.g., within the armpit) to provide patient temperature measurements, upon interrogation. In the embodiment shown, the transponder sensor 40 includes an adhesive surface 68 and a peel away release liner 70 that allows the sensor 40 to be adhered to a patient's body. As will be appreciated, such a transponder sensor 40 may be utilized repeatedly until removed by the patient or medical personnel. In an alternate embodiment, the sensor 40 may be reusable from patient to patient. For example, a double-sided adhesive backing may be utilized such that between applications on different patients, the adhesive backing 68 may be removed from the sensor 40 and replaced. In this regard, the sensor 40 may be sanitized between uses.

Figure 3:
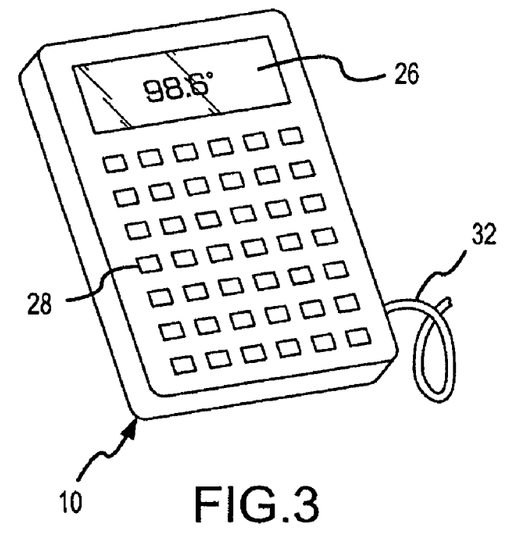
FIG. 3 shows one embodiment of a reader device that may be utilized with the system of FIG. 1.

FIG. 3 shows one embodiment of a reader 10 that may be utilized with the present system 4. As shown, the reader 10 includes a keypad input 28 and a display 26. The keypad input 28 allows medical personnel to input data that may be stored with a temperature measurement. For example, a medical technician may enter a patient's identification number prior to taking a reading such that the patient's identification number, temperature reading, and possibly a time are stored together in the memory 22 of the reader 10. Furthermore, the reader 10 may include an input/output port (not shown) such that after a plurality of measurements are made (e.g., for a plurality of patients) such measurements may be downloaded into a database.

Figure 4:
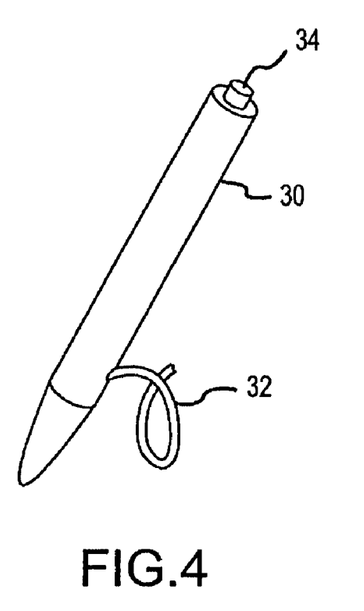
FIG. 4 shows one embodiment of a probe device that may be utilized with the reader device of FIG. 3.
Figure 5:
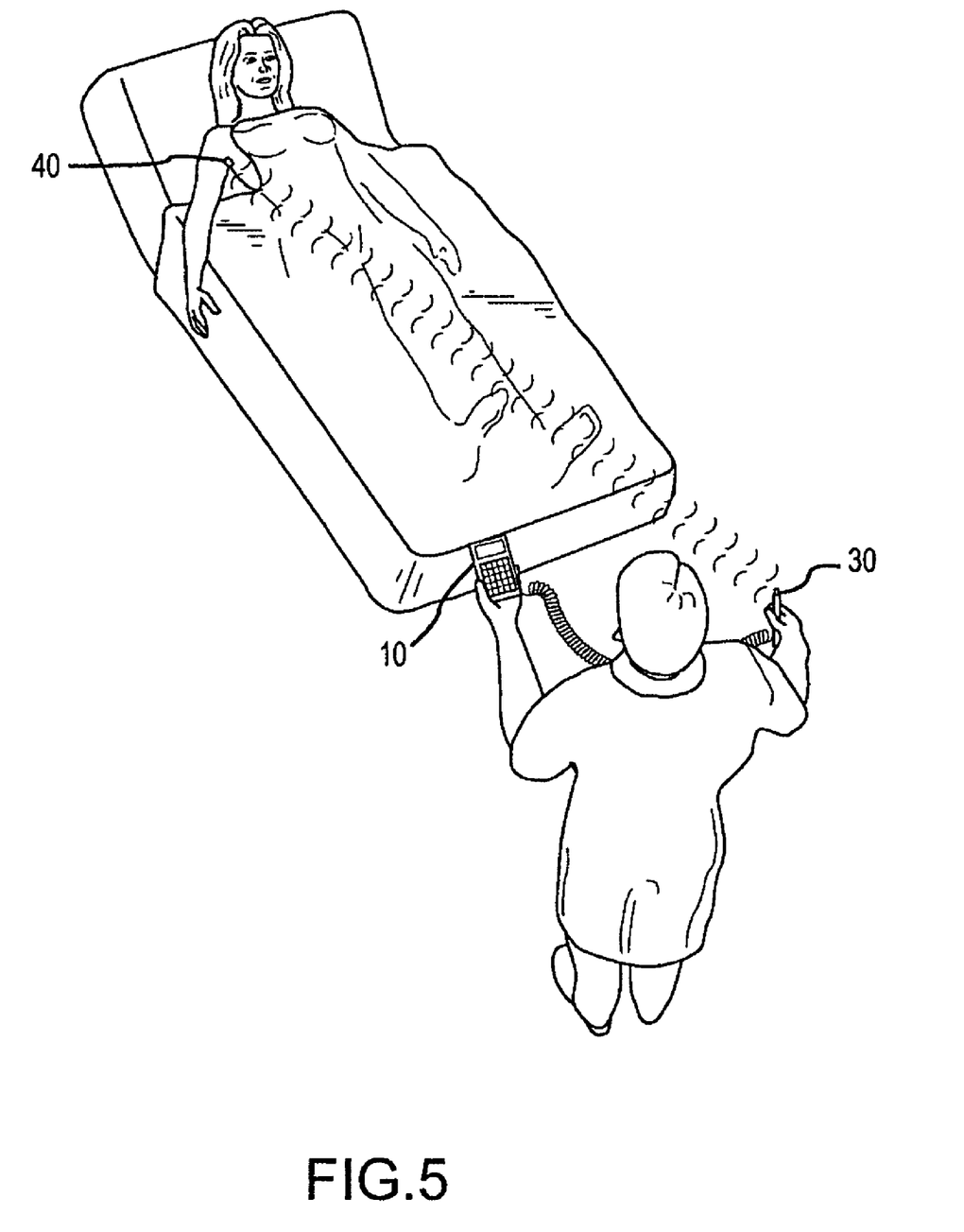
FIG. 5 illustrates use of the reader, probe and sensor devices of FIGS. 1–4 being utilized to monitor the temperature of a patient.

The reader 10 is interconnected to a probe 30 utilizing a flexible cable 32. See FIG. 4. This allows the probe 30, which may house the reader's antenna 12, to be disposed locally (i.e., within the read range) with the transponder sensor 40 such that a reading may be taken. As will be appreciated, depending on the frequency and/or power settings of the reader 10, the read range of the transponder system 4 may require aiming the probe 30 toward the transponder sensor 40. Furthermore, it will be appreciated that a power setting may be selected such that a read range is no greater than about 1.5 feet, such that the probe may have to be disposed proximate to the transducer sensor 40. In this regard, the reader 10 may only power transponder sensors on a desired patient as opposed to powering transponders not of interest, for example, on other patients in the general vicinity of the reader 10. As shown, the probe 30 includes an activation button 34. By depressing this button 34, the interrogation signal is transmitted to a transducer sensor on a patient. See for example FIG. 5.

Figure 6:
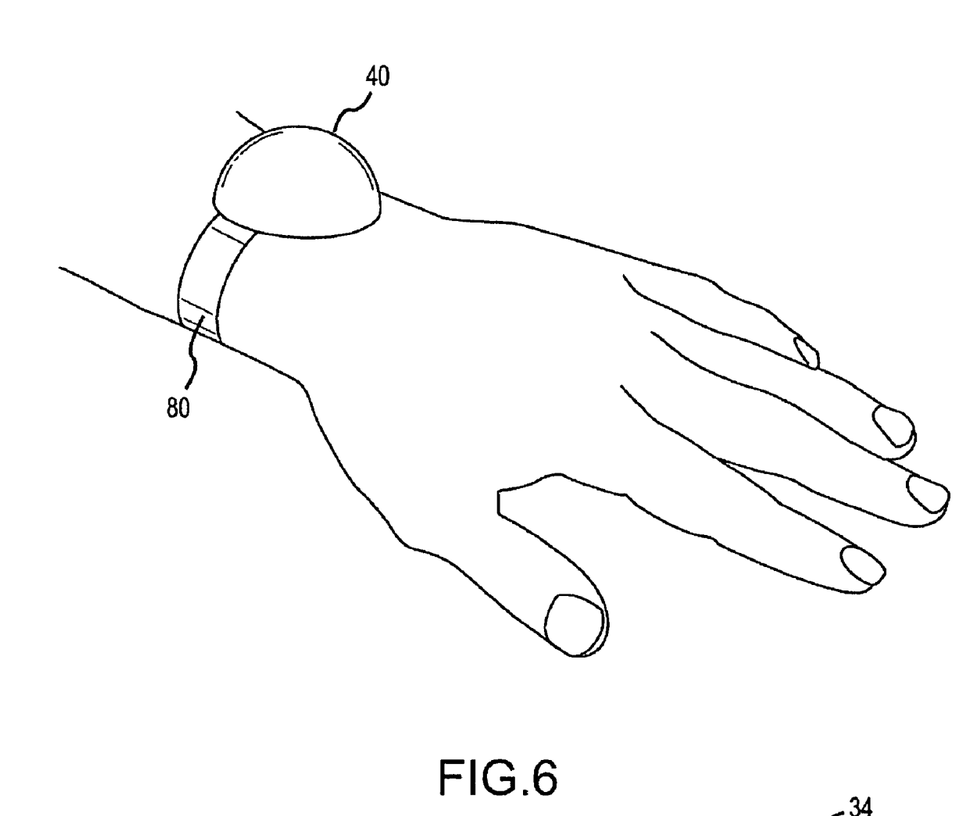
FIG. 6 shows an alternate embodiment of a sensor device.
Figure 7:
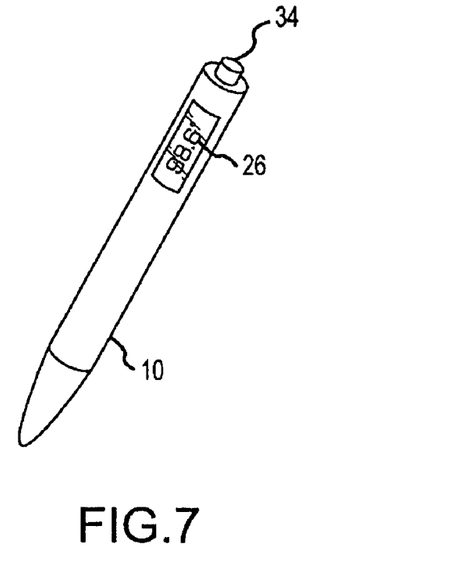
FIG. 7 shows an integrated reader and probe.

FIGS. 6 and 7 show alternate embodiments of the transponder sensor 40 and reader 10, respectively. As shown in FIG. 6, the transponder sensor 40 is integrated into a wristband 80 that may be fit around a patient's wrist. In this regard, the transponder sensor 40 may be reusable between multiple subjects and/or well adapted for in-home applications. FIG. 7 shows a simplified embodiment of the reader 10 that may also be appropriate for home applications. As shown, the reader 10 and display output 26 are incorporated into the probe 30. In this embodiment, the reader 10 does not include an input means.

Figure 8:
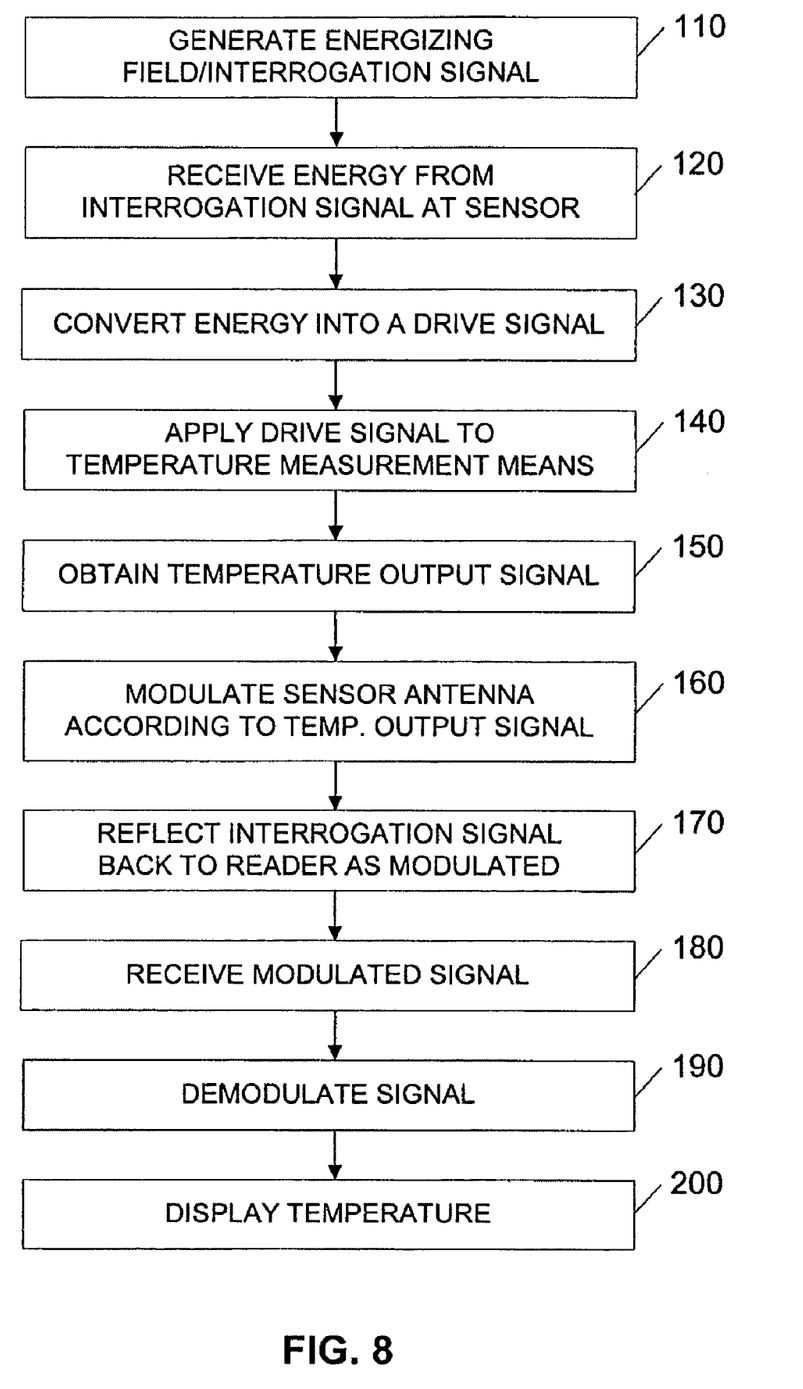
FIG. 8 is a flow sheet of a process that may be performed by the system of FIG. 1.

FIG. 8 shows one process (100) that may be utilized with the system 4 described herein above. Initially, the reader 10 generates (110) an interrogation signal near the transducer sensor 40. A portion of this interrogation signal is received (120) at an antenna of the transducer sensor 40: See for example FIG. 5. The portion of the interrogation signal received (120) at the antenna 42 is converted (130) into a DC drive signal. This DC drive signal is applied (140) to a temperature measurement means 54 to obtain (150) a temperature signal indicative of a temperature of the transducer sensor 40. The temperature signal modulates (160) the antenna 42 of the transponder sensor 40 such that the portion of the interrogation signal generated by the reader 10 is reflected (170) back to the reader 10 as modulated (160) by the temperature signal. Once this information is received (180) by the receiving antenna 16 on the transponder sensor 40, the modulated signal may be demodulated (190) to generate the temperature signal and output (200) a temperature to a display.

The embodiments described above are for exemplary purposes only and are not intended to limit the scope of the present invention. Various adaptations, modifications and extensions of the described non-contact temperature measurement system will be apparent to those skilled in the art and are intended to be within the scope of the invention as defined by the claims which follow. By way of example, the system could utilize a permanently mounted probe for monitoring a temperature. Such a permanently mounted probe could be mounted to a bed or a wall in a patient's room within a read range of the transponder sensor. Additionally, the system could be utilized outside of a hospital setting. For example, such a system could be utilized to monitor the temperature of personnel working it hot environments, such as fire fighters and athletes.

What is claimed:

1. A method for measuring an animate body temperature at an external dermal surface thereof over an air interface, comprising:
   interconnecting a sensor device to the external dermal surface of the animate body, said sensor having a thermally conductive contact surface for thermally contacting said external dermal surface;
   emitting an interrogation signal from a hand held probe having a portable power source;
   receiving a portion of said interrogation signal at said sensor device, wherein said interrogation signal is received via an air interface;
   utilizing energy derived from said interrogation signal to measure a temperature of the animate body at the external dermal surface thereof in thermal contact with said thermally conductive contact surface of said sensor, and to generate a temperature signal indicative of said measured temperature for receipt by said hand-held probe via said air interface; and
   providing a user output indicating said temperature at said hand held probe.

2. The method of claim 1, wherein emitting said interrogation signal comprises emitting an energizing field from said hand held probe.

3. The method of claim 2, wherein said energizing field comprises one of:
   a magnetic field; and
   an electromagnetic field.

4. The method of claim 3, wherein emitting an electromagnetic field comprises emitting a radio frequency (RF) signal.

5. The method of claim 1, wherein, said step of receiving further comprises:
   converting said portion of said interrogation signal into a drive signal.

6. The method of claim 5, wherein said step of utilizing comprises applying said drive signal to a temperature measurement device to obtain said temperature.

7. The method as recited in claim 1, further comprising:
   second receiving said signal indicative of said measured temperature at said hand held probe via said air interface.

8. A method as recited in claim 7, wherein said hand held probe and said sensor are operative to complete said receiving, utilizing and second receiving steps only when located within a predetermined range of each other.

9. A method as recited in claim 8, wherein said predetermined range is less than 4 feet.

10. A method as recited in claim 9, wherein said predetermined range is less than 1.5 feet.

11. A method as recited in claim 1, wherein said providing step comprises:
    supplying at least one of a visual user output and an auditory user output indicating said measured temperature.

12. A method as recited in claim 1, wherein said utilizing step is automatically completed in response to said receiving step.

13. A method as recited in claim 1, wherein said receiving and utilizing steps are completed substantially simultaneously with said emitting step.

14. A method as recited in claim 1, wherein said emitting step comprises:
    selectively activating said hand held probe to emit said interrogation signal.

15. A method as recited in claim 1, further comprising:
    insulating non-contact surfaces of said sensor device.

16. A method as recited in claim 15, wherein said interconnecting step comprises:
    adhering said contact surface of said sensor device to said dermal surface of said animate body.

17. A method as recited in claim 16, wherein said adhering said sensor further comprises removing a protective layer from an adhesive disposed on said contact surface on said sensor device; and,
    contacting said dermal surface with said contact surface.

18. A method as recited in claim 1, further comprising:
    removing said sensor device from said dermal surface after use; and,
    disposing said sensor device after removal.

19. A system for measuring an animate body temperature at an external dermal surface thereof over an air interface, comprising:
    a portable hand-held probe for transmitting and receiving signals via an air interface, said probe including:
    a first antenna;
    a power source; and
    a user output; and
    a sensor, interconnectable to an external dermal surface of an animate body, for receiving a signal from said probe, measuring a temperature of said body at said external dermal surface, and transmitting a response signal indicative of said temperature to said probe via said air interface, said sensor including:
    a second antenna for receiving and sending signals;

a conversion circuit for converting a received signal to a drive signal;

a temperature measurement device operative to utilize said drive signal to measure said temperature and generate an output indicative of said temperature;

an oscillator operative to vary a load applied to said second antenna according to said output in order to generate said response signal; and a thermally conductive contact surface for providing thermal contact with the external dermal surface of the animate body.

20. The system as recited in claim 19 wherein said hand held probe is operative to transmit an energizing field from said first antenna.

21. The system as recited in claim 20, wherein said energizing field comprises one of:

a magnetic field; and an electric field.

22. The system as recited in claim 21, wherein said electric field comprises a radio frequency (RF) signal having a frequency between 100 KHz and 2.5 GHz.

23. The system as recited in claim 20, wherein said first antenna comprises:

a transmitting antenna and a receiving antenna, wherein said transmitting and receiving antennas are separate elements.

24. The system as recited in claim 19, wherein said user output provides at least one of a visual output and an auditory output indicating said temperature.

25. The system as recited in claim 19, wherein said hand-held probe further comprises:

a switch for selectively activating transmission of signals from said first antenna.

26. The system as recited in claim 19, wherein said hand-held probe further comprises:

a memory for storing at least one said temperature.

27. The system as recited in claim 26, wherein said memory is further operative to store information associated with said response signal indicative of said temperature.

28. The system as recited in claim 27, further comprising:

a microprocessor for comparing said response signal with said information to identify said temperature.

29. The system as recited in claim 26, further comprising:

a user input for inputting information for storage with said temperature.

30. The system as recited in claim 26, further comprising:

a data output port for downloading data from said hand-held probe to a data storage system.

31. The system as recited in claim 19, wherein said conversion circuit comprises:

a rectifying circuit for converting said received signal into a DC drive signal.

32. The system as recited in claim 31, further comprising:

a storage means for storing said DC drive signal.

33. The system of claim 19, wherein said temperature measurement device comprises:

a thermistor operative to produce an output indicative of said temperature upon application of said drive signal.

34. The system of claim 19, wherein said sensor further comprises: a memory structure.

35. The system of claim 34, wherein said memory structure includes factory set information.

36. The system of claim 34, wherein said memory structure is read/write capable.

37. The system as recited in claim 19, wherein said sensor further comprises:

a housing for housing said second antenna, said conversion circuit and said temperature measurement device.

38. The system as recited in claim 37, wherein said housing further comprises:

a band sized for disposition around a patient extremity, said band being operative to hold said housing against a dermal surface of an animate body.

39. The system as recited in claim 37, further comprising:

an adhesive surface disposed on said housing for adhering said housing to a dermal surface of an animate body.

40. A system as recited in claim 39, wherein said housing further comprises:

a protective, removable layer covering said adhesive surface.

41. A system as recited in claim 37, wherein said housing includes an insulative layer on a surface that does not cover said thermally conductive surface and does not contact the dermal surface of the animate body.

42. A system for measuring an animate body temperature at an external dermal surface thereof over an air interface, comprising:

a portable hand-held probe for generating an interrogation signal and receiving response signals via an air interface;

a transponder temperature sensor, comprising:

a thermally conductive contact surface adapted to thermally contact an external dermal surface of an animate body;

circuitry for receiving said interrogation signal from said probe, measuring a temperature at said thermally conductive contact surface in thermal contact with the external dermal surface of the animate body, and generating a temperature response signal indicative of said temperature; and insulation covering at least a portion of non-contact surfaces of said transponder.

43. A system as recited in claim 42, further comprising:

an adhesive disposed on said contact surface.

44. A system as recited in claim 43, wherein said passive transponder temperature sensor further comprises:

a release liner, removeably disposed over said adhesive.

45. A system as recited in claim 42, wherein said circuitry is further operative to derive energy from said interrogation signal to measure said temperature and generate said temperature response signal.

* * * * *